United States Patent
Nakagawa et al.

(10) Patent No.: US 8,385,407 B2
(45) Date of Patent: Feb. 26, 2013

(54) MOVING IMAGE CODING APPARATUS, MOVING IMAGE DECODING APPARATUS, MOVING IMAGE CODING METHOD AND MOVING IMAGE DECODING METHOD

(75) Inventors: Akira Nakagawa, Kawasaki (JP);
Shunsuke Kobayashi, Fukuoka (JP);
Bahavani Lalitha Susarla, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1040 days.

(21) Appl. No.: 12/345,004

(22) Filed: Dec. 29, 2008

(65) Prior Publication Data
US 2009/0252218 A1    Oct. 8, 2009

(30) Foreign Application Priority Data

Apr. 7, 2008   (JP) .................... 2008-099821
Apr. 17, 2008  (JP) .................... 2008-108207

(51) Int. Cl.
*H04N 7/12* (2006.01)
(52) U.S. Cl. .................................. 375/240.01
(58) Field of Classification Search ............. 375/240.01
See application file for complete search history.

(56) References Cited

U.S. PATENT DOCUMENTS

2007/0274688 A1    11/2007  Kitada et al.
2008/0170564 A1*    7/2008  Shi et al. .................. 370/386

FOREIGN PATENT DOCUMENTS

JP    2007-67842     3/2007
JP    2007-318615   12/2007

OTHER PUBLICATIONS

Ye-Kui Wang et al., "POC Recovery in Random Access Point SEI Message", Tampere University of Technology and Nokia Corporation, Joint Video Team (JVT) of ISO/IEC MPEG & ITU-T VCEG, JVT-F050, Dec. 2002, pp. 1-5.
Sullivan G. et al., "Editors' Text for ISO/IEC 14496-10:2005 (AVC $3^{rd}$ Edtion)", ISO/IEC JTC1/SC29/WG11, No. N7081, Aug. 11, 2005, pp. 77-318.
Wiegand T, "Editor's Proposed Changes Relative to JVT-E146d37ncm, revision 2", Joint Video Team (JVT) of ISO/IEC MPEG & ITU-T VCEG (ISO/IEC JTC1/SC29/WG11 and ITU-T SG 16 Q.6), $6^{th}$ Meeting, No. JVT-F082r2, Dec. 5, 2002, Awaji, Japan, pp. 1-156.
Kazui K et al., "Modification of decoding process for POC type 1", No. JVT-AA022, Joint Video Team (JVT) of ISO/IEC MPEG & & ITU-T VCEG (ISO/IEC JTC1/SC29/WG11 and ITU-T SG 16 Q.6), $27^{th}$ Meeting, Apr. 24, 2008, Geneva, Switzerland, pp. 1-10.
Kazui K et al., "Modification of POC type 1 specification", No. JVT-AB021, Joint Video Team (JVT) of ISO/IEC MPEG & ITU-T VCEG (ISO/IEC JTC1/SC29/WG11 and ITU-T SG 16 Q.6), $28^{th}$ Meeting, Jul. 20-25, 2008, Hannover, Germany, pp. 1-6.
European Search Report dated Aug. 1, 2011 in corresponding European Patent Application 08172976.6.
Sullivan G. et al., "Editors' Text for ISO/IEC 14496-10:2005 (AVC $3^{rd}$ Edtion)", ISO/IEC JTC1/SC29/WG11, No. N7081, Aug. 11, 2005, pp. i-xvi, 1-318. Wiegand T, "Editor's Proposed Changes Relative to JVT-E146d37ncm, revision 2", Joint Video Team (JVT) of ISO/IEC MPEG & ITU-T VCEG (ISO/IEC JTC1/SC29/WG11 and ITU-T SG 16 Q.6), $6^{th}$ Meeting, No. JVT-F082r2, Dec. 5, 2002, Awaji, Japan, pp. i-xvi, 1-229.
Japanese Office Action mailed Nov. 8, 2011 issued in corresponding Japanese Patent Application No. 2008-108207.

* cited by examiner

*Primary Examiner* — Jay Patel
*Assistant Examiner* — Richard Torrente
(74) *Attorney, Agent, or Firm* — Staas & Halsey LLP

(57) ABSTRACT

In a decoding apparatus in accordance with H.264, when the POC type is determined as "1" and a recovery point SEI is detected, the maximum frame number MaxFrameNum (or its integral multiple) is set as the initial value of the frame number offset (FrameNumOffset).

4 Claims, 10 Drawing Sheets

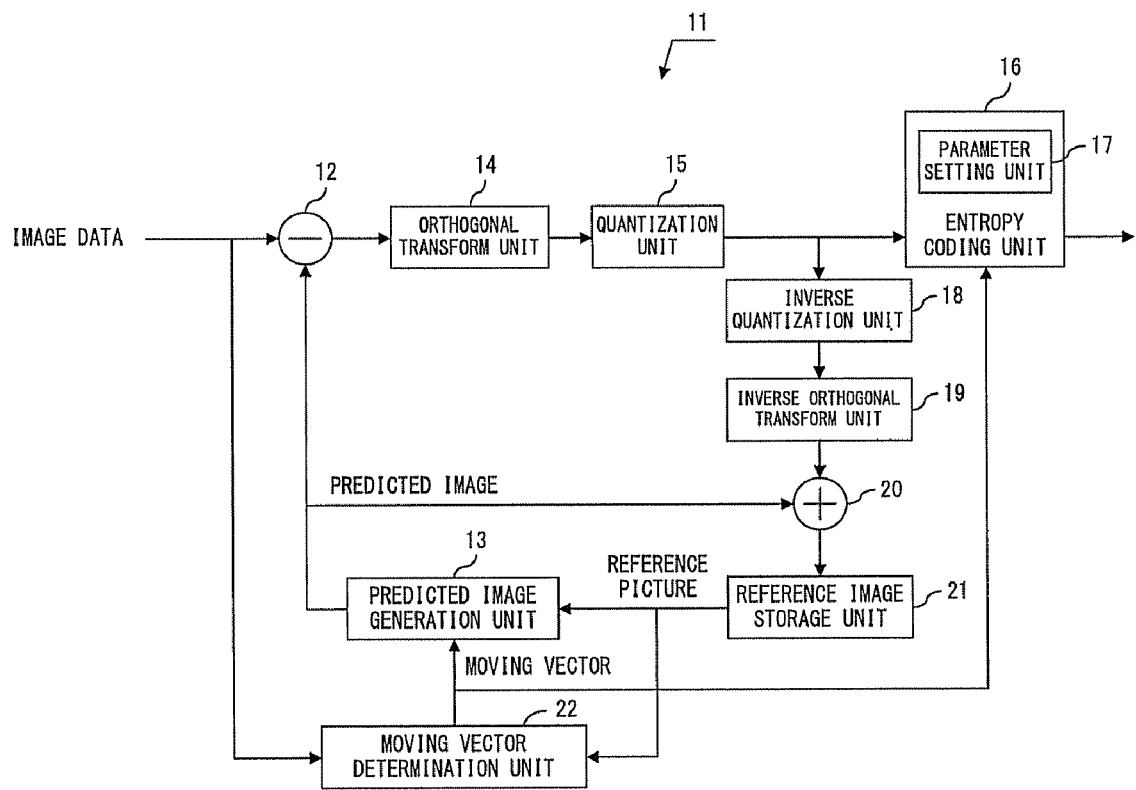
F I G. 1

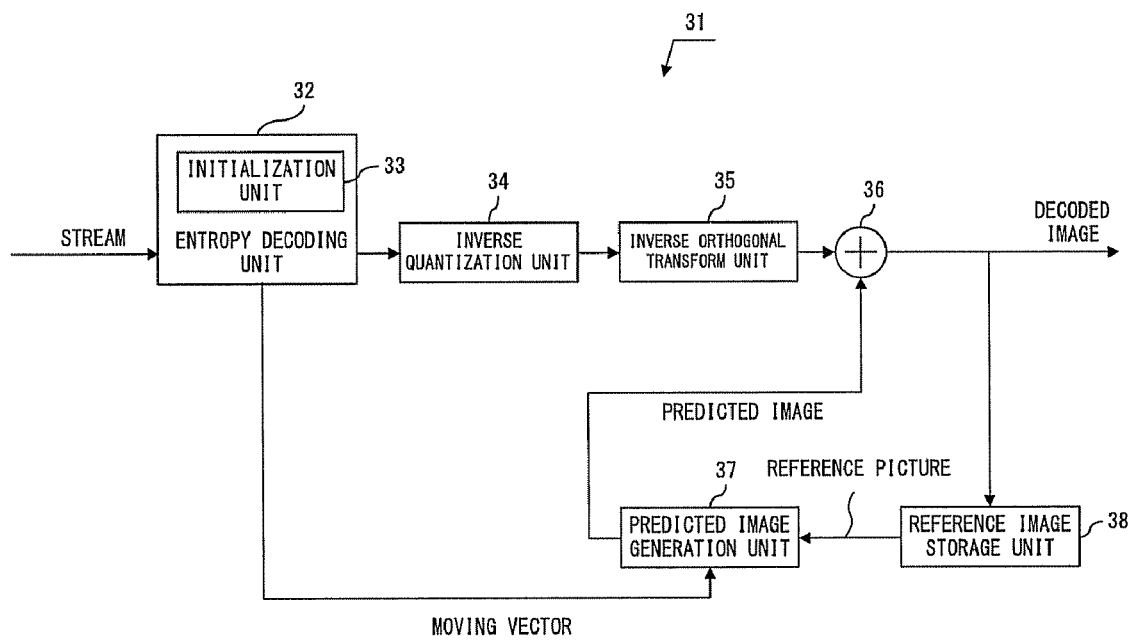
F I G. 3

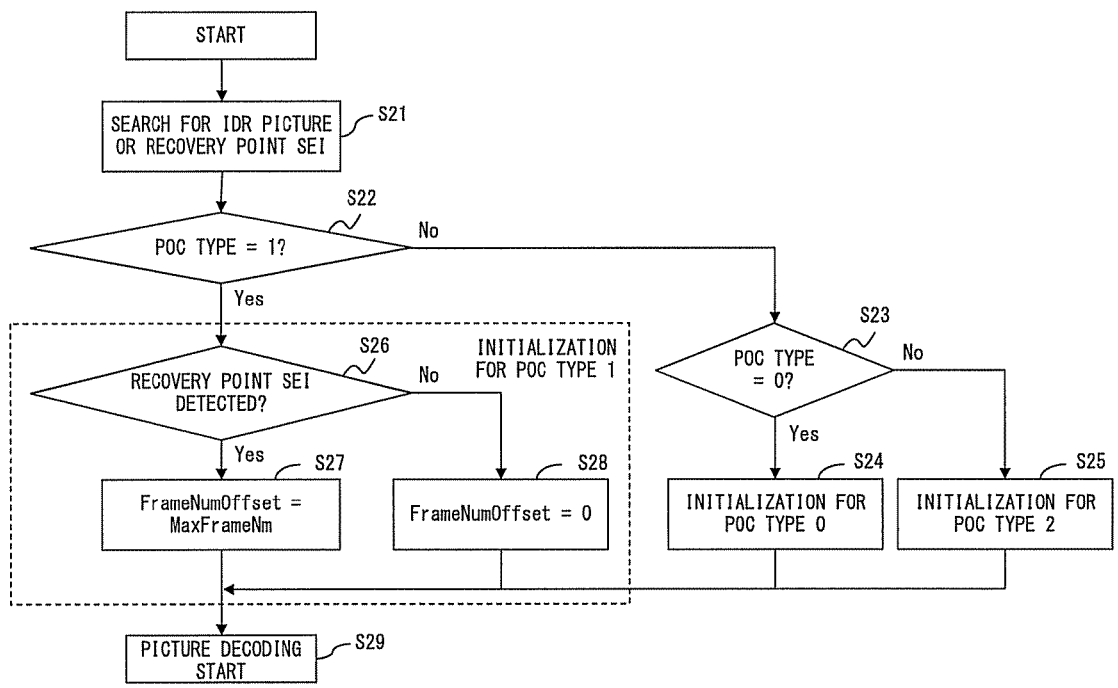
F I G. 4

| Sequence Parameter Set | seq_parameter_set_rbsp(?) { |
|---|---|
| | profile_idc |
| | constraint_set0_flag |
| | constraint_set1_flag |
| | constraint_set2_flag |
| | reserved_zero_5bits /* equal to?0 */ |
| | level_idc |
| | seq_parameter_set_id |
| | log2_max_frame_num_minus4 |
| | pic_order_cnt_type |
| | if( pic_order_cnt_type == 0 ) |
| |    log2_max_pic_order_cnt_lsb_minus4 |
| | else if( pic_order_cnt_type == 1 ){ |
| |    delta_pic_order_always_zero_flag |
| |    offset_for_non_ref_pic |
| |    offset_for_top_to_bottom_field |
| 51 — |    num_ref_frames_in_pic_order_cnt_cycle |
| 52 — |    for( i = 0; i < num_ref_frames_in_pic_order_cnt_cycle; i++ ) |
| 53 — |      offset_for_ref_frame[?i?] |
| | } |
| | : : : : : : |
| | : : : : : : |
| | : : : : : : |

F I G. 5

| Slice | slice_header(?) { |
|---|---|
| | first_mb_in_slice |
| | slice_type |
| | pic_parameter_set_id |
| 61 | frame_num |
| | if( !frame_mbs_only_flag ) { |
| |   field_pic_flag |
| |   if( field_pic_flag ) |
| |     bottom_field_flag |
| | } |
| | if( nal_unit_type == 5 ) |
| |   idr_pic_id |
| | if( pic_order_cnt_type == 0 ){ |
| |   pic_order_cnt_lsb |
| |   if( pic_order_present_flag && !field_pic_flag ) |
| |     delta_pic_order_cnt_bottom |
| | } |
| | if( pic_order_cnt_type == 1 && !delta_pic_order_always_zero_flag ) { |
| |   delta_pic_order_cnt[ 0 ] |
| |   if( pic_order_present_flag && !field_pic_flag ) |
| |     delta_pic_order_cnt[ 1 ] |
| | } |
| | : : : : : : |
| | : : : : : : |
| | : : : : : : |

FIG. 6

| i | 0 | 1 | 2 | 3 | 4 | 5 | 6 | 7 |
|---|---|---|---|---|---|---|---|---|
| offset_for_ref_frame[ i ] | 1 | 2 | 2 | 1 | 3 | 1 | 4 | 2 |

FIG. 7

| | NUMBER OF PICTURES FROM EXCTRACTION START POINT (30TH FROM IDR) PICTURE | 0 | 1 | 2 | 3 | 4 | 5 | 6 | 7 | 8 | 9 |
|---|---|---|---|---|---|---|---|---|---|---|---|
| | frame_num | 14 | 15 | 0 | 1 | 2 | 3 | 4 | 5 | 6 | 7 |
| DECODING FROM IDR | FrameNumOffse | 32 | 32 | 48 | 48 | 48 | 48 | 48 | 48 | 48 | 48 |
| | ABS_Frame_Num | 46 | 47 | 48 | 49 | 50 | 51 | 52 | 53 | 54 | 55 |
| | frameNumInPicOrderCntCycle | 6 | 7 | 0 | 1 | 2 | 3 | 4 | 5 | 6 | 7 |
| | picOrderCntCycleCnt | 5 | 5 | 6 | 6 | 6 | 6 | 6 | 6 | 6 | 6 |
| | TopFieldOrderCnt | 94 | 96 | 97 | 99 | 101 | 102 | 105 | 106 | 110 | 112 |
| | DIFFERENCE WITH RESPECT TO PREVIOUS PICTURE | | 2 | 1 | 2 | 2 | 1 | 3 | 1 | 4 | 2 |
| DECODING FROM Recovery Point SEI | FrameNumOffse | 16 | 16 | 32 | 32 | 32 | 32 | 32 | 32 | 32 | 32 |
| | ABS_Frame_Num | 30 | 31 | 32 | 33 | 34 | 35 | 36 | 37 | 38 | 39 |
| | frameNumInPicOrderCntCycle | 6 | 7 | 0 | 1 | 2 | 3 | 4 | 5 | 6 | 7 |
| | picOrderCntCycleCnt | 3 | 3 | 4 | 4 | 4 | 4 | 4 | 4 | 4 | 4 |
| | TopFieldOrderCnt | 62 | 64 | 65 | 67 | 69 | 70 | 73 | 74 | 78 | 80 |
| | DIFFERENCE WITH RESPECT TO PREVIOUS PICTURE | | 2 | 1 | 2 | 2 | 1 | 3 | 1 | 4 | 2 |

F I G. 8

| i | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| offset_for_ref_frame[ i ] | 1 | 2 | 2 | 1 | 3 | 1 | 4 | 2 | 1 | 2 | 3 | 1 | 2 | 1 | 1 |

F I G. 9

| NUMBER OF PICTURES FROM EXTRACTION START POINT | 0 | 1 | 2 | 3 | 4 | 5 | 6 | 7 | 8 | 9 |
|---|---|---|---|---|---|---|---|---|---|---|
| TopFieldOrderCnt with k=0 | 26 | 27 | 28 | 30 | 32 | 33 | 36 | 37 | 41 | 43 |
| POC DIFFERENCE WITH RESPECT TO PREVIOUS PICTURE | | 1 | 1 | 2 | 2 | 1 | 3 | 1 | 4 | 2 |
| TopFieldOrderCnt with k=1 (TRUE VALUE) | 54 | 55 | 57 | 59 | 60 | 63 | 64 | 68 | 70 | 71 |
| POC DIFFERENCE WITH RESPECT TO PREVIOUS PICTURE | | 1 | 2 | 2 | 1 | 3 | 1 | 4 | 2 | 1 |
| TopFieldOrderCnt with k=2 | 82 | 84 | 86 | 87 | 90 | 91 | 95 | 97 | 98 | 100 |
| POC DIFFERENCE WITH RESPECT TO PREVIOUS PICTURE | | 2 | 2 | 1 | 3 | 1 | 4 | 2 | 1 | 2 |

FIG. 10

MOVING IMAGE CODING APPARATUS, MOVING IMAGE DECODING APPARATUS, MOVING IMAGE CODING METHOD AND MOVING IMAGE DECODING METHOD

CROSS-REFERENCE TO RELATED APPLICATIONS

This application is based upon and claims the benefit of priority of the prior Japanese Patent Application No. 2008-099821, filed on Apr. 7, 2008, and Japanese Patent Application No. 2008-108207, filed on Apr. 17, 2008, the entire contents of which are incorporated herein by reference.

BACKGROUND OF THE INVENTION

1. Field of the Invention

The present invention relates to a moving image coding apparatus, a moving image decoding apparatus, a moving image coding method and a moving image decoding method in accordance with H.264/MPEG4-AVC is a moving image coding system standardized by ITU-T (International Telecommunication Union-Telecommunication Standardization Sector) and ISO (International Organization for Standardization).

2. Description of the Related Art

Patent Document 1 describes a way to make it possible to carry out random playback easily, by performing, when recovering a bit stream, initialization of a decoder upon the first detection of I picture following SPS information.

Patent Document 2 describes, in a moving image coded data editing apparatus that clips out coded data at an arbitrary editing point, a way to make it possible to clip out coded data from an arbitrary editing point by changing header information of coded data after the editing point to contents in which the editing point is specified as the starting point.

H.264/MPEG4-AVC Recommendation specifies Picture Order Counts (POC) that represent the order in which the pictures are to be displayed at the decoder side. Specified encoding methods for the POC include POC type 1, POC type 2 and POC type 3. The decoding process for POC coded as POC type 1 is specified as follows in 8.2.1.2 of H.264/MPEG4-AVC Recommendation:

1. Expression (8-6) in H.264/MPEG4-AVC
The variable Frame Num Offset is derived as follows:

if (nal_unit_type == 5)*FrameNumOffset =*   Expression (1)

0 else if(*prevFrameNum* > frame_num)

*FrameNumOffset =*

*prevFrameNumOffset + MaxFrameNum* else

*FrameNumOffset = prevFrameNumOffset*

The expression (1) above is for deriving Frame Num Offset, which is a process as follows.

When the NAL unit type is "5", the frame number offset FrameNumOffset is initialized to "0". When the NAL unit type is not "5" and the previous frame number is larger than the current frame number, the value obtained by adding the maximum frame number MaxFrameNum to prevFrameNumOffset is set as Frame Num Offset.

2. Expression (8-7) in H.264/MPEG4-AVC
The variable absFrameNum is derived as follows:

if (num_ref_frames_in_pic_order_cnt_cycle != 0)   Expression (2)

*absFrameNum =*

*FrameNumOffset* + frame_num else *absFrameNum =*

0 if (nal_ref_idc == 0 && *absFrameNum* > 0)

*absFrameNum = absFrameNum* – 1

The above expression (2) is for deriving absFrameNum that is the number of pictures on the basis of an IDR (Instantaneous Decoding Refresh) picture, which is a process as follows.

When num_ref_frames_in_pic_order_cnt_cycle is not "0", the value obtained by adding the frame number frame_num to FrameNumOffset is set as absFrameNum. When num_ref_frames_in_pic_order_cnt_cycle is "0", absFrameNum is set to "0".

When the flag nal_ref_idc indicating whether or not it is the reference picture or not is "0" and absFrameNum is larger than "0", the value obtained by subtracting "1" from absFrameNum is set as absFrameNum.

3. Expression (8-8) in H.264/MPEG4-AVC
When absFrameNum>0, picOrderCntCycleCnt and frameNumInPicOrderCnt Cycle are derived as follows:

if (*absFrameNum* > 0){*picOrderCntCycleCnt =*   Expression (3)

(*absFrameNum* – 1) / num_ref_frames_in_pic

_ordercnt_cycleframeNumInPicOrderCntCycle=

(*absFramesNum* – 1)% num_ref_frames

_in_pic_order_cnt_cycle}

The above expression (3) represents a process for deriving picOrderCntCycleCnt and frameNumInPicOrderCntCycle.

4. Expression (8-9) in H.264/MPEG4-AVC
The variable expectedDeltaPerPicOrderCntCycle is derived as follows:

*expectedDeltaPerPicOrderCntCycle =*   Expression (4)

0 for (*i* = 0; *i* < num_ref_frames_in_pic_order_cnt_cycle;

*i*++)*expectedDeltaPerPicOrderCntCycle* += offset_for_ref_frame[*i*]

The above expression (4) represents a process for deriving expectedDeltaPerPicOrderCntCycle. It is a process for deriving offset_for_ref_frame[i] that is determined by the value of the variable i.

5. Expression (8-10) in H.264/MPEG4-AVC
The variable expectedPicOrderCnt is derived as follows:

if (*absFrameNum* > 0)   Expression (5)

{*expectedPicOrderCnt = picOrderCntCycleCnt* ∗

-continued $$\textit{expectedDeltaPerPicOrderCnt Cycle for}$$

$$(i = 0; i <= \textit{frameNumInPicOrderCntCycle};$$

$$i++)\textit{expectedPicOrderCnt} =$$

$$\textit{expectedPicOrderCnt} + \text{offset\_for\_ref\_frame}[i]\}$$

$$\text{else } \textit{expectedPicOrderCnt} =$$

$$0 \text{ if } (\text{nal\_ref\_idc} == 0)\textit{expectedPicOrderCnt} =$$

$$\textit{expectedPicOrderCnt} + \text{offset\_for\_non\_ref\_pic}$$

When the absolute frame number absFrameNum is larger than 0 in the process in the expression (5) above, the value obtained by multiplying picOrderCntCycleCnt by expectedDeltaPerPicOrderCnt Cycle is obtained as expectedPicOrderCnt. Further, the value obtained by adding offset_for_ref_frame[i] indicating the difference for the POC of the picture to expectedPicOrderCnt is obtained as expectedPicOrderCn.

In addition, if the flag nal_ref_idc indicating whether or not it is the reference picture is 0, the value obtained by adding offset_for_non_ref_pic indicating the difference for the POC of a non-reference picture to expectedPicOrderCnt is obtained as expectedPicOrderCn.

6. Expression (8-11) in H.264/MPEG4-AVC

The variables TopFieldOrderCnt or BottomFieldOrderCnt are derived as follows:

if (! field_pic_flag)                                   Expression (6)

$$\{TopFieldOrderCnt = expectedPicOrderCnt +$$

$$\text{delta\_pic\_order\_cnt}[0] BottomFieldOrderCnt =$$

$$TopFieldOrderCnt + \text{offset\_for\_top\_to}$$

$$\_\text{bottom\_field} + \text{delta\_pic\_order\_cnt}[1]\}$$

$$\text{else if (! bottom\_field\_flag)} TopFieldOrderCnt =$$

$$expectedPicOrderCnt +$$

$$\text{delta\_pic\_order\_cnt}[0] \text{ else } BottomFieldOrderCnt =$$

$$expectedPicOrderCnt +$$

$$\text{offset\_for\_top\_to\_bottom\_field} +$$

$$\text{delta\_pic\_order\_cnt}[0]$$

In the process of the expression (6) above, with "!field_pic_flag", that is, if it is not a field slice, the value calculated by adding expectedPicOrderCnt and delta_pic_order_cnt[0] is obtained as TopFieldOrderCnt.

Meanwhile, types of information that the decoding apparatus can obtain from a coded stream is as follows:

nal_unit_type indicating the type of NAL unit; the frame number frame_num; the maximum frame number MaxFrameNum; num_ref_frames_in_pic_order_cnt_cycle and nal_ref_idc used for deriving a POC; offset_for_ref_frame[i], offset_for_non_ref_pic, and field_pic_flag used for deriving a type 1 POC; delta_pic_order_cnt[0], delta_pic_order_cnt[1], and bottom_field_flag used for calculating the POC.

[Patent Document 1] Japanese Laid-open Patent Publication No. 2007-318615

[Patent Document 2] Japanese Laid-open Patent Publication No. 2007-67842

[Non Patent Document 1] Ye-Kui Wang and another, JVT-F050 POC Recovery in Random Access Point SEI Message, Tampere University of Technology and Nokia Corporation.

Non Patent Document 1 proposes, in order to make it possible to perform the decoding with a random access using the exactly same POC value as in the case of the decoding for a POC type 1 started from an IDR picture, coding and sending a value obtained by dividing the frame number offset FrameNumOffset by the maximum frame number MaxFrameNum.

However, there is a problem with the above value since it requires an information amount up to 28 bits when the value is an unsigned integer, and up to 57 bits with Golomb coding, increasing the information amount to be transmitted.

SUMMARY OF THE INVENTION

A moving image coding apparatus disclosed herein is a moving image coding apparatus in accordance with H.264/AVC, including a setting unit setting the value of num_ref_frames_in_pic_order_cnt_cycle field in the sequence parameter set specified in H.264/AVC to a divisor of MaxFrameNum, and a coding unit coding image data.

A moving image decoding apparatus disclosed herein is a moving image decoding apparatus in accordance with H.264/AVC, including an initialization unit initializing, when the decoding is started from a picture to which a recovery point SEI is attached, FrameNumOffset specified in H.264/AVC to an integral multiple of MaxFrameNum, and a decoding unit decoding a coded stream.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram illustrating the main part of a coding apparatus.

FIG. 3 is a diagram illustrating the main part of a decoding apparatus.

FIG. 4 is a flowchart of a decoding process according to an embodiment.

FIG. 5 is a diagram illustrating the fields of a sequence parameter set.

FIG. 6 is a diagram illustrating the fields of a slice.

FIG. 7 is a diagram illustrating the relationship between a variable i and offset_for_ref_frame[i].

FIG. 8 is a diagram illustrating the values of respective fields and POC differences in the case where the decoding is started from an IDR and the case where the decoding is started from a recovery point SEI.

FIG. 9 is a diagram illustrating the relationship between a variable i and offset_for_ref_frame[i].

FIG. 10 is a diagram illustrating the relationship between the value of k and POC differences.

DESCRIPTION OF THE EMBODIMENTS

Figure 2:
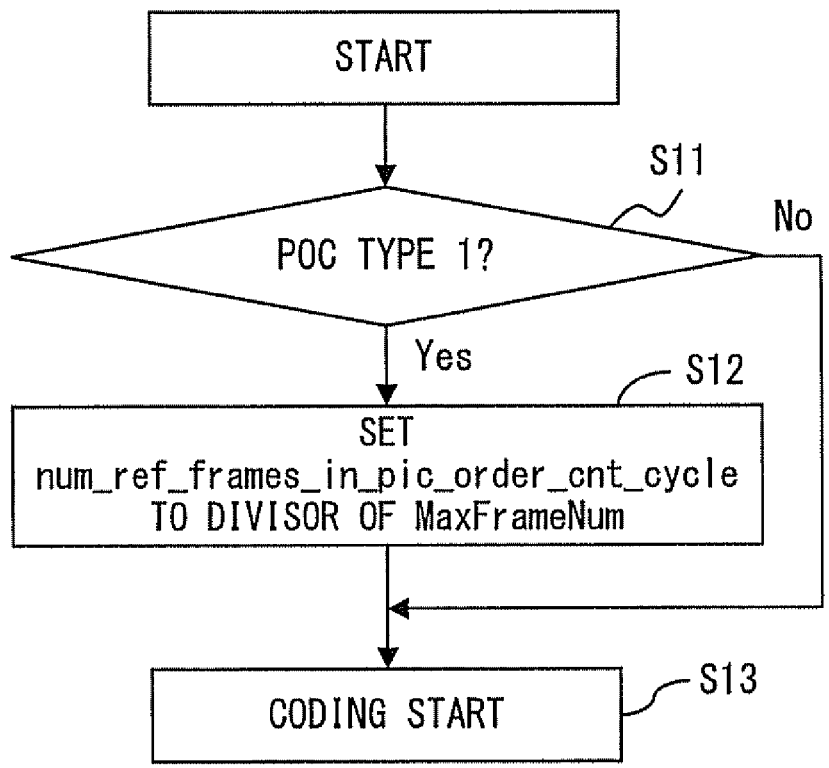
FIG. 2 is a flowchart of a coding process according to an embodiment.

Preferred embodiments of the present invention are described below.

H.264/MPEG4-AVC specifies the following two types as the pictures from which decoding can be started.

IDR (Instantaneous Decoding Refresh) picture: an I picture, which is the first picture of a sequence.

A picture to which a Recovery Point SEI is attached: Recovery Point SEI is attached to a picture in the middle of a sequence, indicating that even if the picture is in the middle of the sequence, the extraction can be started from the picture.

Chapter 8.2.1.2 of H.264/MPEG-AVC specifies, for the decoding of POC type 1, the process in the case where the decoding is started from an IDR picture. However, with a random access using a recovery point SEI (when starting the decoding in the middle of a coded stream), the POC value may not correspond to the picture display order, even if the POC type 1 is decoded according to the specified process.

For example, it is assumed that MaxFrameNum is 16; num_ref_frames_in_pic_order_cnt_cycle is 15; and recovery point SEI is inserted into the 30th frame from an IDR picture to show that the extraction can be started from the picture. In addition, the variable i and offset_for_ref_frame[i] (i=0~num_ref_frames_in_pic_order_cnt_cycle−1) are assumed to be in the relationship as described in FIG. 8. Furthermore, for simplification, delta_pic_order_cnt[0] and delta_pic_order_cnt[1] are assumed to be "0" at any time. It is also assumed that any non-reference picture does not exist between the IDR picture and the picture with the recovery point SEI.

In this case, since the frame number of the extraction-start picture is the residue with regard to the maximum frame number MaxFrameNum, the value of the frame number frame_num field included in the slice header of the 30th picture is 30 mod 16, e.g., "14".

When the decoding is started from an IDR picture, the absolute frame number absFrameNum is "30", according to the expression (2). Then, substituting the above values into picOrderCntCycleCnt and frameNumInPicOrderCntCycle in the expression (3), the expressions picOrderCntCycleCnt=(30−1)/15=1 frameNumInPicOrderCntCycle=(30−1)%15=14   are obtained. In this case, the POC for the top field TopFieldOrderCnt is obtained as follows, using the expressions (1) through (6).

expectedDeltaPerPicOrderCntCycle=27 expectedPicOrderCnt=picOrderCntCycleCnt*picOrderCntCycleCnt+Σoffset_for_ref_frame[i] (i=0 . . . 14)=54

On the other hand, when the decoding is started from the 30th picture with a recovery point SEI, the information that can be obtained at the decoder side in units of pictures is the frame number frame_num only. Meanwhile, the frame number offset FrameNumOffset calculated in the expression (1) represents the number of carry over occurred to the frame number frame_num field (how many times it has been reset to 0). Assuming this number as k, absFrameNum in the expression (2) can be rewritten as follows.

absFrameNum=$k$*MaxFrameNum+frame_num

The value of k is unknown at the decoder side. This leads to ambiguity when deriving absFrameNum.

For example, assuming the cases where (a) k=0, (b) k=1, and (c) k=2, (a) In the case of k=0 absFrameNum=14 picOrderCntCycleCnt=(14−1)/15=0 frameNumInPicOrderCntCycle=(14−1)%15=13

(b) In the case of k=1 absFrameNum=30 picOrderCntCycleCnt=(30−1)/15=1 frameNumInPicOrderCntCycle=(30−1)%15=14

(c) In the case of k=2 absFrameNum=46 picOrderCntCycleCnt=(46−1)/15=3 frameNumInPicOrderCntCycle=(46−1)%15=0

FIG. 9 is a diagram illustrating the relationship between the value of k and the POC difference. FIG. 9 illustrates the number of pictures from the extraction-start point, TopFieldOrderCnt for each value of k, and the POC difference with respect to the previous picture. Meanwhile, the true value of the POC in the decoding started from an IDR corresponds to the case where k=1.

As is apparent from FIG. 9, even when the number of pictures from the extraction-start point is the same, the POC difference with respect to the previous picture differs, depending on the value of k.

For example, the POC difference between the fifth picture and the sixth picture from the decoding start point is 3 when k=0; is 2 when k=1; and is 4 when k=3. Thus, the value is not determined uniquely.

According to the decoding method described above, the correct value of the difference in POC between the respective pictures cannot be obtained, unless the value of k at the time of the extraction start is obtained correctly.

When decoding image data that have been coded in accordance with H.264/MPEG4-AVG (hereinafter, referred to as H.264), the absolute value of a Picture Order Count (POC) is not required, and the decoding can be performed correctly, as long as the relative value of the POC of each picture is correct.

In this embodiment, the value of the field num_ref_frames_in_pic_order_cnt_cycle specified for the sequence parameter set (SPS) in accordance with H.264 is set to a divisor of MaxFrameNum at the coding apparatus side.

At the decoding apparatus side, decoding is performed as follows, when the decoding is started from an IDR picture, or an extraction-start picture, such as the one to which a recovery point SEI and the like is attached, as specified in H.264. The absolute frame number is initialized to a value obtained by adding an integral multiple of the maximum frame number MaxFrameNum to the frame number frame_num.

Through the above process, when decoding is started from a picture with a recovery point SEI, the relative value of the POC between pictures can be adjusted to the same value as the relative value of the POC between pictures in the case where the decoding is started from an IDR picture. The method for realizing it is specifically described below.

In the decoding process for the POC type 1, the frame number offset FrameNumOffset needs to be initialized. FrameNumOffset is initialized to 0 with the decoding of an IDR picture, and then the value of the maximum frame number MaxFrameNum is added, every time when the condition frame_num<prev_frame_num (the previous value of frame_num) is satisfied.

The frame number frame_num is the relative value of the frame number counted from the IDR picture and satisfies the condition 0≦frame_num<MaxFrameNum (the maximum value of frame_num). When the frame number frame_num reaches the maximum frame number MaxFrameNum, the count starts again from 0.

The absolute frame number absFrameNum can be expressed as follows, referring to the expression (2).

$$absFrameNum = FrameNumOffset + frame\_num \quad \text{Expression (7)}$$

The frame number offset FrameNumOffset is obtained by multiplying the maximum frame number MaxFrameNum by a constant from the definition of the express (1). Assuming the constant as K, the following expression can be obtained.

$$absFrameNum = K*MaxFrameNum + frame\_num \quad \text{Expression (8)}$$

According to the expression (2) above, absFrameNum=absFrameNum−1; according to the expression (3), frameNumInPicOrderCntCycle=(absFrameNum−1)%num_ref_frames_in_pic_order_cnt_cycle; therefore, the following expression can be obtained.

$$frameNumInPicOrderCntCycle = \\ (K*MaxFrameNum + frame\_num - 1)\% \\ num\_ref\_frames\_in\_pic\_order\_cnt\_cycle = \\ (((K*MaxFrameNum)\% \, num\_ref\_frames\_in\_pic \\ \_order\_cnt\_cycle) + frame\_num - 1) \\ \% \, num\_ref\_frames\_in\_pic\_order\_cnt\_cycle$$

Expression (9)

According to the expression (9) above, the problem with a random access that the value of frameNumInPicOrderCntCycle cannot be obtained correctly because (absFrameNum−1) is unknown can be settled with the problem that the constant K is unknown.

Looking at the expression including the constant K: ((K*MaxFrameNum)%num_ref_frames_in_pic_order_cnt_cycle), when num_ref_frames_in_pic_order_cnt_cycle is set to a divisor of the maximum frame number MaxFrameNum, the residue of the above expression including K becomes 0. Therefore, the value of (K*MaxFrameNum)% num_ref_frames_in_pic_order_cnt_cycle becomes 0, regardless of the value of K.

Therefore, by setting num_ref_frames_in_pic_order_cnt_cycle to a divisor of the max frame number MaxFrameNum, the value of frameNumInPicOrderCntCycle in the expression (9) can be obtained uniquely, regardless of the value of K.

The decoding of image data that have been coded as described above is described next, This embodiment includes, when the decoding is started from a picture to which a recovery point SEI is attached, an additional process to initialize the frame number offset FrameNumOffset to an integral multiple of MaxFrameNum. For example, for simplification, FrameNumOffset=MaxFrameNum is realized with the initialization.

In this case, the expression (1) mentioned above can be rewritten as expression (10) below.

$$\text{if } (nal\_unit\_type == 5) FrameNumOffset = \\ 0 \text{ else if (decoding from Recover\_Point\_SEI)} \\ FrameNumOffset = MaxFrameNum \\ \text{else if } (prevFrameNum > frame\_num) \\ FrameNumOffset = \\ prevFrameNumOffset + MaxFrameNum \text{ else} \\ FrameNumOffset = prevFrameNumOffset$$

Expression (10)

In addition, the expression (10) can be described with another expression.

$$\text{if } (nal\_unit\_type == 5) FrameNumOffset = \\ 0 \text{ else if } (prevFrameNumOffset \text{ is unknown}) FrameNumOffset = \\ MaxFrameNum \text{ else if } (prevFrameNum > frame\_num) \\ FrameNumOffset = prevFrameNumOffset + \\ MaxFrameNum \text{ else } FrameNumOffset = prevFrameNumOffset$$

Note that "decoding from Recover_Point_SEI" in if (decoding from Recover_Point_SEI) is equivalent to "prevFrameNumOffset is unknown".

The details of the above process are as follows. Whether the NAL unit type is 5 or not is determined. If the NAL unit type is not 5, whether the decoding is started from the picture with the recovery point SEI or not is determined. If the decoding is started from the picture with the recovery point SEI, the maximum frame number MaxFrameNum is set as the frame number offset FrameNumOffset.

If the NAL unit type is not 5, whether the previous frame number prevFrameNum is larger than the current frame number frame_num or not is determined. If the previous frame number prevFrameNum is larger than the current frame number frame_num, it is determined that the frame number has exceeded the maximum frame number, and the value obtained by adding the maximum frame number MaxFrameNum to prevFrameNumOffset is set as FrameNumOffset.

If the previous frame number prevFrameNum is not larger than frame_num, prevFrameNumOffset is set as FrameNumOffset.

Through the process described above, when the decoding is started from a picture with a recovery point SEI, FrameNumOffset is initialized to the value that is an integral multiple of MaxFrameNum. Then, since the value of num_ref_frames_ in_pic_order_cnt_cycle is set to a divisor of MaxFrameNumOffset at the coding apparatus side, the value of frameNumInPicOrderCntCycle in the expression (9) can be obtained uniquely. As a result, the relative value of the POC with the decoding stared from the picture with the recovery point SEI becomes the same value as with the decoding started from an IDR picture. Thus, the pictures can be decoded in a correct order.

Next, a moving image coding apparatus and a moving image decoding apparatus having the coding function and decoding function as described above are explained.

FIG. 1 is a diagram illustrating the main part of a moving image coding apparatus (hereinafter, referred to as a coding apparatus) 11. A subtractor 12 outputs data obtained by subtracting, from image data, a predicted image generated by a predicted image generation unit 13, to an orthogonal transform unit 14. The orthogonal transform unit 14 performs orthogonal transform for the data output from the subtractor 12. A quantization unit 15 quantizes the data after the orthogonal transform.

The entropy coding unit 16 has a parameter setting unit 17. The entropy coding unit 16 performs coding of image data, and the parameter setting unit 17 performs processes such as setting of the value of num_ref_frames_in_pic_order_cnt_cycle in a sequence parameter set.

An inverse quantization unit 18 and an inverse orthogonal transform unit 19 perform the inverse processes of the quantization and orthogonal transform. The image data after the inverse transform by the inverse orthogonal transform unit 19 is added with the predicted image in an adder 20 and stored in a reference image storage unit 21.

A moving vector determination unit 22 calculates a moving vector on the basis of the current image and a reference image output from the reference image storage unit 21, and outputs the calculated moving vector to the predicted image generation unit 13 and the entropy coding unit 16. The predicted image generation unit 13 generates a predicted image on the basis of the moving vector and the reference picture, and outputs the predicted image to the adder 20 and the subtractor 12.

FIG. 2 is a flowchart of the coding process performed by the coding apparatus 11. The entropy coding unit 16 determines whether the picture is to be coded with POC type 1 or not (FIG. 2, S11).

When the picture is to be coded with POC type 1 (S11, YES), the process proceeds to step S12, where num_ref_frames_in_pic_order_cnt_cycle in the sequence parameter set SPS is set to a divisor of the maximum frame number MaxFrameNum.

After the step S12, or when the determination at the step S11 is NO, the process proceeds to step S13, where the coding process for image data is performed.

Thus, as the coding apparatus 11 sets num_ref_frames_in_pic_order_cnt_cycle in the sequence parameter set SPS to a divisor of the maximum frame number MaxFrameNum, the relative value of the POC can be obtained uniquely at the decoding apparatus 31 side. In addition, since the coding apparatus only sets the value of num_ref_frames_in_pic_order_cnt_cycle to a divisor of MaxFrameNum, the data amount of coded data does not increase.

Using the moving image coding apparatus, the moving image decoding apparatus can perform the decoding in a correct order using a recovery point SEI.

FIG. 3 is a diagram illustrating the main part of a moving image decoding apparatus (hereinafter, referred to as a decoding apparatus) 31. An entropy decoding unit 32 has a function to decode an image stream for which variable length coding has been performed, and an initialization unit 33. The initialization unit 33 initializes the value of the frame number offset to an integral multiple of the maximum frame number.

An inverse quantization unit 34 performs an inverse quantization process for image data that have been decoded in the entropy decoding unit 32, and an inverse orthogonal transform unit 35 performs an inverse orthogonal transform process for the data after the inverse quantization.

An adder 36 generates a decoded image by adding the image data after the inverse orthogonal transform and a predicted image output from the predicted image generation unit 37. A reference image storage unit 38 stores the decoded image.

The predicted image generation unit 37 generates a predicted image on the basis of a reference picture stored in the reference image storage unit 38 and a moving vector calculated in the entropy decoding unit 32.

FIG. 4 is flowchart of the decoding process performed by the decoding apparatus 31. First, a search for an IDR picture or a recovery point SEI is performed (step S21).

Whether the POC type is "1" or not is determined (step S22). When the POC type is not "1" (S22, NO), the process proceeds to step S23, where whether the POC type is "0" or not is determined. If the POC type is "0" (S23, YES), the process proceeds to step S24, where the initialization process for the POC type 0 is performed. When the POC type is not "0" according to the determination in step S23 (S23, NO), the process proceeds to step S25, where the initialization process for the POC type 2 is performed.

When the POC type is "1" according to the determination is the step S22, the process proceeds to step S26, where whether a recovery point SEI has been detected or not is determined.

When a recovery point SEI has been detected (S26, YES), the process proceeds to step S27, where the maximum frame number MaxFrameNum (or a value that is an integral multiple of the maximum frame number) is set as the initial value of the frame number offset FrameNumOffset.

When any recovery point SEI has not been detected according to the determination in the step S26 (S26, NO), the process proceeds to step S28, where "0" is set as the initial value of the frame number offset FrameNumOffset.

After the step S24, S25, S27 or S28, the process proceeds to step S29, where the decoding process for the picture is started.

Through the above process, when the decoding is started from a picture to which a recovery point SEI is attached, MaxFrameNum (or its integral multiple) is set as the initial value of the frame number offset FrameNumOffset. Then, since num_ref_frames_in_pic_order_cnt_cycle is set to a divisor of MaxFrameNum, the residue of the expression (9) described above becomes "0". Therefore, the value of the expression (9) can be obtained uniquely.

Using the moving image decoding apparatus, a correct relative value for the POC type 1 can be obtained when performing the decoding using a recovery point SEI, making it possible to decode a coded stream in a correct display order.

FIG. 5 is a diagram illustrating the sequence parameter set in accordance with H.264. The sequence parameter set has a field 51 in which num_ref_frames_in_pic_order_cnt_cycle is stored, a field 52 indicating the range of the value of the variable i, and a field 53 in which the reference frame offset offset_for_ref_frame[?i?] is stored.

In this embodiment, a divisor of MaxFrameNum is set as num_ref_frames_in_pic_order_cnt_cycle in the field 51.

FIG. 6 is a diagram illustrating the fields of a slice. The frame number frame_num is stored in a field 61 of the slice.

Figure 7:
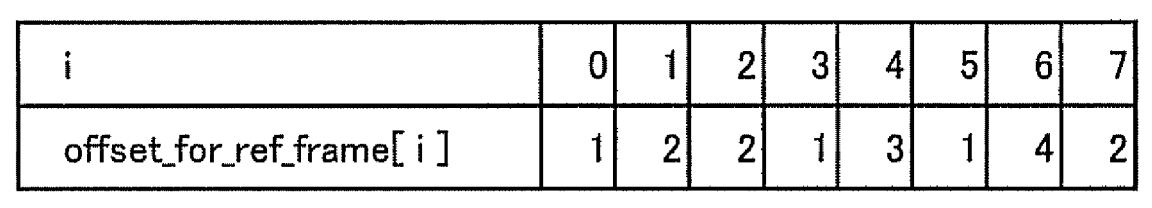

FIG. 7 is a diagram illustrating the relationship between the variable i and offset_for_ref_frame[i]. The relationship is, for example, as follows: offset_for_ref_frame[i]=1 when i=0, offset_for_ref_frame[i]=2 when i=1, offset_for_ref_frame[i]=2 when i=2.

FIG. 8 is a diagram illustrating the parameter values and POC differences with the decoding started from an IDR and with the decoding started from a recovery point SEI.

Assuming log 2_max_frame_num_minus4 as 0, MaxFrameNum is 16. In this embodiment, num_ref_frames_in_pic_order_cnt_cycle is set to a divisor of MaxFrameNum. For example, num_ref_frames_in_pic_order_cnt_cycle is set to, for example, 8.

In the decoding apparatus 31, when the NAL unit type is 5, that is, with the decoding of an IDR picture, 0 is set as the initial value of the frame number offset FrameNumOffset, by the process in the expression (10).

When the decoding is started from an IDR picture, the frame number offset FrameNumoffset of the 30th picture is 32, and its absolute frame number absFrameNum is 46. The value of TopFieldOrderCnt of the 30th picture is 94.

In the same manner, FrameNumOffset of the 31st picture is 32, and its absFrameNum is 47. TopFieldOrderCnt of the 31st picture is 96. In this case, the POC difference with respect to the previous picture is 2.

Meanwhile, when the decoding is started from a recovery point SEI, the frame number offset FrameNumOffset is initialized to an integral multiple of the maximum frame number MaxFrameNum, according to the expression (10). In this case, since MaxFrameNum is 16, FrameNumOffset is, for example, 16. The absolute frame number MaxFrameNum is FrameNumOffset+frame_num according to expression (7). The frame number frame_num transmitted from the coding apparatus 11 is 14. Therefore, absFrameNum is 16+14=30. In this case, TopFieldOrderCnt of the 30th picture is 62.

In the same manner, FrameNumOffset of the 31st picture is 16, and its absFrameNum is 31. Then, TopFieldOrderCnt of the 31nd picture is 64. In this case, the POC difference with respect to the previous picture is 2.

Calculating the POC difference with respect to the previous picture when the decoding is started from an IDR picture from the value of TopFieldOrderCnt, the POC differences of the 31st picture and beyond are, as illustrated in FIG. 8, "2, 1, 2, 2, 1 . . . ".

Meanwhile, the POC differences with respect to the previous picture when the decoding is started from a recovery point SEI are, as illustrated in FIG. 8, "2, 1, 2, 2, 1 . . . ".

Using the coding apparatus 11 and the decoding apparatus 31 according to the embodiment, while the values of the POC are different between the decoding started from an IDR and the decoding started from a recovery point SEI, the same POC differences are obtained for both cases. In accordance with H.264, the absolute value of the POC does not need to be correct, and as long as correct relative POC values are obtained, the pictures can be decoded in a correct display order.

Thus, using the coding apparatus, the decoding apparatus, the coding method and the decoding method according to the embodiment, pictures can be decoded in a correct display order, with a random access using a recovery point SEI.

In addition, the modification of num_ref_frames_in_pic_order_cnt_cycle in subclause 7.4.2.1 of H.264/MPEG-AVC and the modification of the decoding process for POC type 1 in subclause 8.2.1.2 of H.264/MPEG-AVC are proposed below.

The modification of num_ref_frames_in_pic_order_cnt_cycle is described below.
num_ref_frames_in_pic_order_cnt_cycle is used in the decoding process for picture order count as specified in subclause 8.2.1. The value of num_ref_frames_in_pic_order_cnt_cycle shall be any divisor of MaxFrameNum and in the range of 0 to 255, inclusive.
Proposed change on equation 8-6 is the following if (nal_unit_type == 5)*FrameNumOffset* =

0 else if (*prevFrameNumOffset is unknown*)*FrameNumOffset* =

*MaxFrameNum* else if (*prevFrameNum* > frame_num)

*FrameNumOffset* = *prevFrameNumOffset* +

*MaxFrameNum* else *FrameNumOffset* = *prevFrameNumOffset*

Rationale
Equation 8-8 can be written as the following frameNumInPicOrderCntCycle=(FrameNumOffset+ frame_num−1)%num_ref_frames_in_pic_order_cnt_cycle If the value of num_ref_frames_in_pic_order_cnt_cycle is a divisor of MaxFrameNum, the result of (FrameNumOffset % num_ref_frames_in_pic_order_cnt_cycle) is always zero because FrameNumOffset is the product of MaxFrameNum and non-negative integer. Thus frameNumInPicOrderCntCycle in Equation 8-8 is independent of prevFrameNumOffset.

The values of absNumFrame in Equation 8-7 and frameNumInPicOrderCntCycle in Equation 8-8 for the first decoding picture are (MaxFrameNum+frame_num) and ((frame_num−1)%num_ref_frames_in_pic_order_cnt_cycle), respectively.
As the definition of MaxFrameNum is 2^{log 2_max_frame_num_minus4}, num_ref_frames_in_pic_order_cnt_cycle should also be in the form of 2^N where N is non-negative integer.

Using the coding apparatus disclosed herein, image data can be coded, without increasing the data amount of coded data, such that the decoding apparatus can perform the decoding in a correct display order from a recovery point SEI. In addition, using the coding apparatus disclosed herein, the decoding can be performed in a correct display order, when the decoding is started from a picture to which a recovery point SEI is attached.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. A moving image coding apparatus in accordance with H.264/AVC, comprising:
   a determining unit to determine whether a picture is to be coded with POC type 1;
   a setting unit to set a value of num_ref_frames_in_pic_order_cnt_cycle field to a divisor of MaxFrameNum, wherein the value is included in a sequence parameter set specified in H.264/AVC; and
   a coding unit to code image data,
   wherein if it is determined the picture is to be coded with POC type 1 in said determining unit the setting unit sets the value and the coding unit codes the image data,
   wherein POC indicates a picture order count,
   wherein MaxFrameNum indicates a maximum frame number,
   wherein num_ref_frames_in_pic_order_cnt_cycle indicates a number of reference frames in a picture order count cycle.
2. A moving image coding method in accordance with H.264/AVC, comprising:
   determining whether a picture is to be coded with POC type 1;
   if it is determined the picture is to be coded with POC type 1 in said determining,
   setting a value of num_ref_frames_in_pic_order_cnt_cycle field to a divisor of MaxFrameNum, wherein the value is included in a sequence parameter set specified in H.264/AVC,
   wherein POC indicates a picture order count,
   wherein MaxFrameNum indicates a maximum frame number,
   wherein num_ref_frames_in_pic_order_cnt_cycle indicates a number of reference frames in a picture order count cycle.

3. A moving image coding method in accordance with H.264/AVC, comprising:
- determining whether a picture is to be coded with POC type 1;
- if it is determined the picture is to be coded with POC type 1 in said determining,
- setting a value of num_ref_frames_in_pic_order_cnt_cycle field to a divisor of MaxFrameNum, wherein the value is included in a sequence parameter set specified in H.264/AVC, and
- coding image data;
- if it is determined the picture is not to be coded with POC type 1 in said determining,
- coding image data without setting the value of num_ref_frames_in_pic_order_cnt_cycle field to a divisor of MaxFrameNum,
- wherein POC indicates a picture order count,
- wherein MaxFrameNum indicates a maximum frame number,
- wherein num_ref_frames_in_pic_order_cnt_cycle indicates a number of reference frames in a picture order count cycle.

4. A moving image coding apparatus in accordance with H.264/AVC, comprising:
- means for determining whether a picture is to be coded with POC type 1;
- means for setting a value of num_ref_frames_in_pic_order_cnt_cycle field to a divisor of MaxFrameNum, wherein the value is included in a sequence parameter set specified in H.264/AVC; and
- means for coding image data,
- wherein if it is determined the picture is to be coded with POC type 1 in said means for determining the means for setting a value sets the value and the means for coding image data codes the image data,
- wherein POC indicates a picture order count,
- wherein MaxFrameNum indicates a maximum frame number,
- wherein num_ref_frames_in_pic_order_cnt_cycle indicates a number of reference frames in a picture order count cycle.

* * * * *

UNITED STATES PATENT AND TRADEMARK OFFICE
CERTIFICATE OF CORRECTION

PATENT NO. : 8,385,407 B2
APPLICATION NO. : 12/345004
DATED : February 26, 2013
INVENTOR(S) : Akira Nakagawa et al.

It is certified that error appears in the above-identified patent and that said Letters Patent is hereby corrected as shown below:

Title Page, item [75] (Inventors), Replace third inventor "Bahavani Lalitha Susarla" with "Lalitha Bhavani Susarla", therefor.

Signed and Sealed this
Sixteenth Day of July, 2013

Teresa Stanek Rea
*Acting Director of the United States Patent and Trademark Office*